Figure 1:
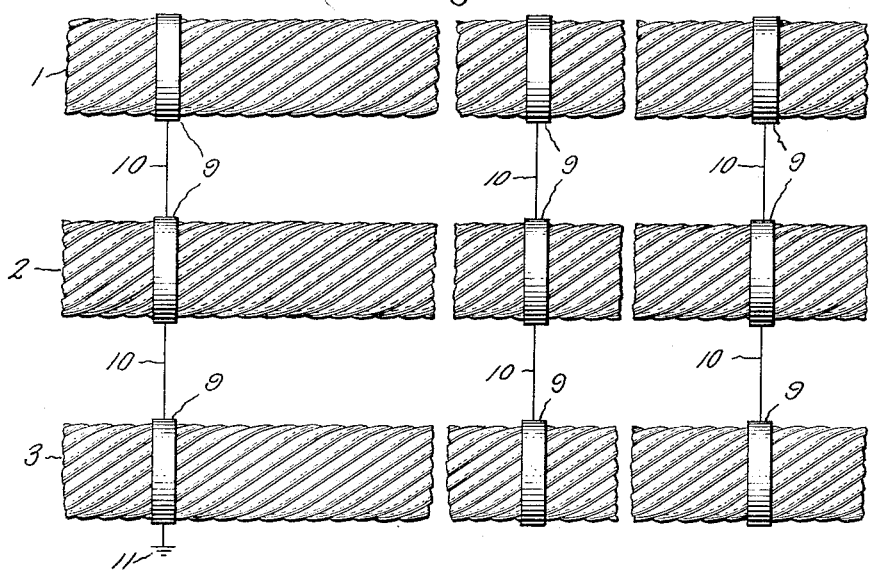

Oct. 19, 1926.

G. B. SHANKLIN

POWER SYSTEM

Filed Oct. 24, 1924

1,603,875

Inventor:
George B. Shanklin,
by *Alexander S. Lunz*
His Attorney.

Patented Oct. 19, 1926.

1,603,875

UNITED STATES PATENT OFFICE.

GEORGE B. SHANKLIN, OF SCHENECTADY, NEW YORK, ASSIGNOR TO GENERAL ELECTRIC COMPANY, A CORPORATION OF NEW YORK.

POWER SYSTEM.

Application filed October 24, 1924. Serial No. 745,710.

My invention relates to power systems wherein separate single conductor cables are utilized for the transmission of alternating current, and has for its object the provision of an improved arrangement whereby the inductive losses of such cables may be rendered substantially independent of the spacing between the cables.

A copending application of Benjamin S. Hornby, for United States Letters Patent, Serial No. 689,941, filed February 1, 1924, and assigned to the same assignee as the present invention, discloses a system of power transmission by cables wherein the outer and inner conductors are interconnected through transformers which are provided for insuring that sufficient neutralizing current to maintain the inductance of the cable within reasonable limits is caused to circulate in the outer conductors. My invention differs from that disclosed in the aforesaid application in that the cable armor comprises a low resistance material, such as copper, which renders the use of the neutralizing transformers shown by the aforesaid application unnecessary and greatly simplifies the interconnection of the cable in a polyphase system.

In the underground or submarine transmission of large amounts of electric power by multi-conductor cables designed for operation at or above 33,000 volts, difficulty is encountered due to the fact that expansion and contraction of the cables are apt to stretch the cable sheaths thus producing voids which result in failure of the cables. The most satisfactory solution of this difficulty seems to involve the use of single conductor cables comprising a protective armor wrapped tightly around the lead sheath in a manner to afford mechanical protection and prevent stretching of the sheath. A cable provided with an armor for mechanical protection is adapted to be buried directly in the ground, or to be used for submarine work, but the use of a single conductor cable having the usual types of magnetic steel armor in this manner involves difficulty for the reason that the use of separate cables with magnetic steel armor results in high line inductance and excessive losses due to the current induced in the cable sheath. In accordance with my invention, this difficulty is avoided by the provision of an armor comprising materials, such as copper and iron or steel arranged to form a low resistance circuit for the circulation of the currents induced in the armor which are thus utilized to neutralize the flux external to the cable in a manner to reduce greatly the line inductance and the losses in the lead sheath. It will be observed that this arrangement renders transposition unnecessary and permits the cables to be spaced close together or far apart to suit the particular conditions encountered without appreciably affecting their electrical characteristics. This arrangement is of particular utility in submarine work where the cable spacing is not under control and wide spacing of the ordinary single conductor cable would cause a prohibitively high induced current in the lead sheath.

My invention will be better understood from the following description when considered in connection with the accompanying drawing and its scope will be pointed out in the appended claims.

Figure 2:
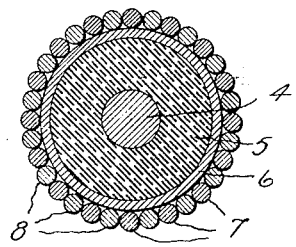

Referring to the drawing, Fig. 1 shows polyphase cables which are interconnected in accordance with my invention; and Fig. 2 is a sectional view of one of the cables shown in Fig. 1.

Fig. 1 shows a plurality of cables 1, 2 and 3 which may form a part of a three-phase system. As shown by Fig. 2, each of these cables comprises an inner conductor 4, an insulating portion 5, a lead sheath 6, and a protective armor which comprises low resistance material and is illustrated as made up of alternate copper and iron conductors 7 and 8. It is of course apparent that copper clad steel wire or any other suitable means for producing a low resistance armor having the required mechanical strength and low electrical resistance may be substituted for the alternate copper and steel wires shown by the drawing.

The resistance per unit length of the cable armors is determined somewhat by the size of the cables and need not be substantially greater than the resistance per unit length of the inner conductors. As indicated by Fig. 1, the armors of the different cables are interconnected at their opposite ends by collars 9 and conductors 10, or in any other suitable manner, to afford a low resistance path for circulation of the currents induced in the armors by reason of their inductive relation to the inner or main conductors 4. Under these conditions, the currents in the armor serve to neutralize the effect of the flux produced by current in the main conductors 4, and both the inductance of the cables and the sheath losses are maintained within reasonable limits. To aid in this result and for protective purposes, the cable sheaths may be grounded at intervals as indicated at 11.

When the cables are used for the submarine transmission of power, the spacing is not under control and it is feasible to interconnect the armors only at the ends where they emerge from the water. Where the cables are placed in ducts or buried in the ground, it is desirable to interconnect the armors at points intermediate the cable ends both for the purpose of maintaining them at substantially the same potential and to protect the armors by affording a number of parallel paths for the disposition of current in case of a break down short circuit.

What I claim as new and desire to secure by Letters Patent of the United States, is:—

1. A polyphase power system comprising a plurality of separate cables each arranged to conduct current of one phase only and each provided with an inner conductor for transmitting power and with an outer conductor insulated from said inner conductor and composed of iron and copper and means arranged to interconnect said outer conductors at points spaced apart to form secondary circuits whereby the inductive losses of said cables are reduced.

2. A polyphase power system comprising a plurality of separate cables each arranged to conduct current of one phase only and each provided with an inner conductor for transmitting power and with an outer conductor composed of materials having a combined resistance per unit length not substantially greater than the resistance per unit length of said inner conductor, and means arranged to interconnect said outer conductors at points spaced apart to form secondary circuits whereby the inductive losses of said cables are reduced.

3. A polyphase power system comprising a plurality of separate cables each arranged to conduct current of one phase only and each provided with an inner conductor for transmitting power and with an outer conductor composed of copper and iron having a combined resistance per unit length not substantially greater than the resistance per unit length of said inner conductor, and conductors arranged to interconnect said outer conductors at points spaced apart to form secondary circuits whereby the inductive losses of said cables are reduced.

In witness whereof, I have hereunto set my hand this 23rd day of October, 1924.

GEORGE B. SHANKLIN.